Figure 1:
Figure 2:
Figure 3:
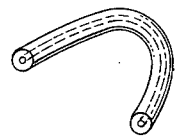
Figure 4:
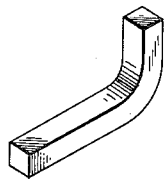
Figure 5:
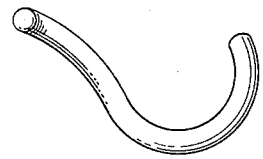
Figure 6:
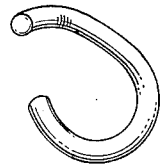
Figure 7:
Figure 8:

Dec. 4, 1962 M. L. ZWEIGLE ETAL 3,066,382
STRANDED ALKENYL AROMATIC POLYMER FOAM
FOR LOOSE-FILL PACKAGING
Filed Nov. 15, 1960

INVENTORS.
Maurice L. Zweigle
Wayne E. Humbert
BY
Griswold & Burdick
ATTORNEYS

United States Patent Office 3,066,382
Patented Dec. 4, 1962

3,066,382
STRANDED ALKENYL AROMATIC POLYMER
FOAM FOR LOOSE-FILL PACKAGING
Maurice L. Zweigle and Wayne E. Humbert, Midland,
Mich., assignors to The Dow Chemical Company, Midland, Mich., a corporation of Delaware
Filed Nov. 15, 1960, Ser. No. 69,316
4 Claims. (Cl. 28—78)

This invention relates to the art of packing or packaging articles, objects, and materials of various kinds, which are subject to damage or breakage by shock or impact, with stranded, thermoplastic polymer foam for transportation, preservation, and storage purposes. The invention also relates to a new type of curled or non-linear stranded thermoplastic polymer foam.

There are many classes of objects and materials that require special packing and protection for the purpose of shipping, storing or for merely preserving the same. They include fragile and easily damaged articles such as electrical, electronic, and X-ray equipment having thin, easily broken glass envelopes, shock sensitive material such as those containing fulminates, or the like, delicate optical instruments and components, medical and surgical equipment, materials and specimens, valuable and fragile antiques and archaeological objects, vibration and shock sensitive mechanisms, and the like. The conventional procedures for packaging or packing such articles and materials comprises the construction of special boxes or crates, the use of soft, yielding packing material such as excelsior, shredded paper, sawdust, popcorn, shredded plastic foams, and foamed-in-place thermoplastic compositions which are poured in a liquid state around the article to be packaged and subsequently foamed by direct heating, indirect heating, or otherwise.

These known packaging methods and materials are not only dusty to handle, subject to attack by chemicals and absorb water and moisture, but are liable to destruction and and infestation by worms and other vermin and are less satisfactory than is desired.

It is a primary object of the invention to provide a new type of synthetic polymer packing or dunnage material which is light in weight with a low bulk density is resilient and possesses good strength sufficient to support heavy articles without crushing or powdering, and is chemically inert, water and moisture-resistant, dustless, non-toxic, vermin-proof, and buoyant.

Another object is to provide packing means and procedure that inhibits or prevents the article or material being packed from being subjected to vibration, shock or other damaging treatment and does not permit substantial movement or other change in the position of the packed article or the packing material upon handling, tipping, or inverting of the package.

Still another object is to provide a packing material wherein the enclosing sheath of stranded cellular polymeric material is flexible, yielding, and resilient sufficient to cradle and support an object in such a manner that it is well protected against heavy or severe impact as well as against low amplitude vibration, and the like.

A further object is to provide a package that may be readily deliberately opened without endangering or damaging the enclosed article or object and which dunnage or packing material thereof remains substantially unharmed and can be reused for future packaging.

Other objects and features of the invention will become apparent from the following detailed description of the invention.

The invention comprises supporting an object sensitive to damage by impact, vibration, or shock within a body of cellular, plastic foam, consisting of a tangled mass of curled, bent, curved, or twisted, elongated, individual pieces of a foamed alkenyl, aromatic polymer, which pieces of cellular foam consist of a substantially continuous outer plastic skin integral with and covering the interior individually-closed thin-walled portions of the cellular foam pieces which are composed for the most part of individually-closed thin-walled cells suitably of sizes of from 0.1 to 1 millimeter in diameter.

Figure 9:
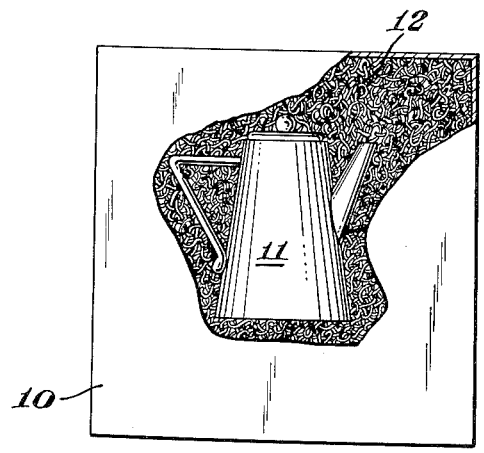

The invention is described more particularly with reference to the accompanying drawing wherein:

FIGS. 1–8, inclusive are diagrammatic sketches showing various forms of the elongated foam plastic material, and FIG. 9 is a diagrammatic sketch partly in section showing a fragile article packaged within a body or mass of the tangled elongated foamed polymer packaging material contained in a paper carton or box.

In the drawing FIGS. 1–8, inclusive show various of the curled, twisted or curved forms of the elongated pieces of the foamed polymer packaging material such as pieces of round, oval, square, rectangular or thick-walled tubular, cross-section, and having a substantially continuous outer skin covering and protecting the inner cellular portions of the foam.

FIG. 1 shows the end or cross-section of a piece of the elongated foam packaging material when such elongated piece is cut and showing the severed cells thereof.

Thus, the foamed polymer strands segments or elongated pieces can be of circular, square, rectangular, elliptical half-circular or other cross-section and of a length such that the ratio of length to cross-sectional area is at least 8:1, and is preferably in a ratio of from 8:1 to 20:1.

In general, the pieces or segments of the foamed polymer packaging material can have a cross-sectional area equivalent to that of a circle having a diameter of from 0.125 to 0.75 inch and are correspondingly of a length of from about 2.5 to 15 inches long, although longer pieces or segments can be used.

FIG. 9 of the drawing is self-explanatory and shows a container 10 which can be a paper box carton, wood or metal container within which a fragile object such as a china teapot indicated by the numeral 11, is packed or cushioned in a tangled mass or body of the foamed polymer segments 12. The fragile article 11 is positioned or supported within the mass of the foamed polymer segments 12 so that the packing material completely surrounds the article and protects it from damage by impact or shock both from without and from within. Two or more fragile objects can be packaged in a single container in the manner just described.

The foamed polymer packing material can be in the form of elongated pieces such as segments of strands, rods, bars, tapes, tubes, and the like. The individual pieces or segments of the foamed polymers can have an absolute density between about 0.5 and 5 pounds per cubic foot, and as previously mentioned, are of curled, bent, curved, twisted or other non-linear configuration such that when poured or heaped into a mass or body, the segments form a tangled mass having a bulk density of from 0.25 to about 2 pounds per cubic foot of the segments, the tangled segments being intertwined so as to press or bind against one another upon application of pressure and form a resilient yielding mass which cradles objects packaged therein and prevents damage by impact or shock from without.

The foamable, thermoplastic polymers applicable in the production of the non-linear, elongated, individual, cellular pieces of the invention are the resinous alkenyl aromatic polymers containing a volatile organic foaming agent uniformly distributed throughout. The polymers comprise, in chemically combined form, at least about 70 percent by weight of at least one alkenyl aromatic compound having the general formula:

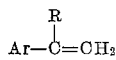

wherein "Ar" represents an aromatic hydrocarbon or a nuclear halohydrocarbon radical of the benzene series, and "R" is hydrogen or the methyl radical. Examples of such alkenyl aromatic polymers are homopolymers of styrene, alphamethyl styrene, ortho-, meta-, and para-methyl styrene, ar-ethylstyrene, and ar-chlorostyrene; the copolymers of two or more of such alkenyl aromatic compounds with one another; and copolymers of one or more of such alkenyl aromatic compounds with minor amounts of other readily polymerizable olefinic compounds such as divinylbenzene, methylmethacrylate, or acrylonitrile, etc.

The foaming agents are usually gases or volatile liquids such as dichlorodifluoromethane, low boiling petroleum ethers and mixtures thereof, carbon dioxide and the like, which have been dissolved or otherwise incorporated within the thermoplastic polymer or resinous material.

The non-linear, curled, bent or twisted, elongated, individual pieces of the thermoplastic, foamable polymer can be produced by known extrusion methods whereby the thermoplastic polymer or copolymer material in a solid or granular form is heated at a temperature above the fusion or softening temperature of the copolymer while continuously mixing the same in a suitable mixing device such as is included as part of commercially available enclosed thermoplastic blender-extruder equipment until a uniform, homogeneous flowable mass is obtained. Thereafter, the heated and blended mass may be extruded into various forms, such as strings, rods, tubes, etc., cooled and cut into length by means of a conventional type extruder and cutter system.

The extruded material can be cut into segments and allowed to foam to a cellular body or it can be quickly cooled to a solid state and thereafter heated to the softening point of the polymer or above and foamed to a cellular form. The latter mode of operation is preferred.

It may be mentioned that the foamed segments having a curled, bent, curved, twisted, non-linear configuration can readily be prepared by extruding a gel consisting essentially of a molten or heat-plastified thermoplastic organic polymer, e.g. a flowable gel of polystyrene containing from 5 to 10 percent by weight of a volatile organic fluid such as pentane or dichlorodifluoromethane dissolved therein under pressure, at temperatures between about 90° and 110° C. into a zone of lower pressure such as the atmosphere, and rapidly cooling the extruded material to a temperature below about 40° C., then cutting the cooled material into segments of a desired length. Thereafter, the cooled segments can be foamed to form the cellular packing material by heating the same to temperatures between 90° and 110° C. in any usual way such as by steam, infrared lamps, or hot water. The segments of the foamable composition are preferably annealed by reheating the cooled segments to temperatures between about 50° and 70° C. with hot water for a period of from about 30 to 360 seconds or longer, sufficient to relieve the orientation in the segments with resultant curling, bending, curving, or twisting of the same, then cooling the segments prior to appreciable foaming thereof. The annealed segments in the unfoamed state are of relatively high bulk density and are more suitable for storing, shipping and handling than are the foamed segments, and they can readily be foamed in usual ways by heating at temperatures between about 90° and 110° C. to produce the foamed packaging material at or near the place of use.

The heat to soften the variously-shaped, foamable, thermoplastic polymers segments and to foam the same may be derived from an externally generated source. Thus, steam, radiant heat, hot water, hot air, and the like are ordinarily employed for the purpose of foaming and the expandable, thermoplastic materials to produce the low-bulk-density, resilient, non-linear, elongated, cellular packing material of this invention.

In packaging, the article or object to be packaged should be positioned, preferably centered, in a suitable size outer container, such as a paper carton, wooden box, or steel drum, initially provided with a bottom layer of the tangled, interlocking, cellular pieces described above. Thereafter, an additional quantity of the cellular pieces may be introduced in such a manner as to completely fill the outer container and support the article therein against substantial movement. Finally, the outer container is closed and the cover securely fastened, in a conventional manner appropriate to the type of outer container employed, so as to complete the packaging.

The method of using the new packing material of the invention will be described in greater detail in the following examples and the advantages of the invention will be better understood from a consideration of the following experimental data which are intended for purposes of illustration and are not regarded as limitations to the appended claims.

*Example I*

A box was constructed of ¾ inch plywood having cleated corners, 2 in. by 4 in. wooden protective skids, and provided with full size Plexiglas windows on one side, one end, and as the lid or top cover of the box. The inside dimensions of the box measured 27 in. by 27 in. by 13 in. and the weight of the unfilled box was 55 pounds. A layer 2 in. deep of non-linear, stranded, polystyrene foam in the form of curled, bent and curved segments having the dimension of ¼ inch in diameter by 6 inches long and the bulk density of 0.5 pound per cubic foot of the tangled strands was placed in the bottom of the box as a cushioning mass on which to place the article to be packaged. A General Electric steam seal regulator weighing 143 pounds was centrally positioned in the box on top of the 2 inch deep cushioning layer of the stranded polystyrene foam, leaving a 2 inch space on all sides. Thereafter, one-half of each side and a corner of a box was filled with similar stranded polystyrene foam of a different color (one corner each—red—green—yellow—blue) in sufficient amounts to surround and maintain the regulator from substantial movement in the box. The colored stranded foam was used to evaluate the movement of the material in the endurance tests which follow. The unfilled, top section of the box was completely packed with a layer 2 inches deep or more of the stranded polystyrene foam so that when the box lid or cover was nailed in place a tight, compact condition existed between the regulator, the stranded foam packing and the outer plywood-Plexiglas box so that little or no movement of the regulator occurred upon turning the box upside down. The total weight of the stranded, interlocking, polystyrene foam used to cushion the regulator on all sides was 2 lbs. The gross weight of the regulator packaged ready for shipping was 200 pounds.

The package was transported by station wagon from Lynn, Massachusetts to Schenectady, New York where it was tested on a L.A.B. Corp. vibrator and vibrated for 2.25 hours being turned 90 degrees every thirty minutes. This vibration test represents the equivalent of about 2250 miles of freight car travel. The package was then given five runs on a Conbur impact machine employing procedure similar to that described in A.S.T.M. D880–50, "Standard Method of Incline Impact Test for Shipping Containers." The bumper was equipped with the standard optional hazard, a 4 by 4 in. timber which was positioned in turn for a direct blow on each side and on the bottom of the package.

Following the vibration and impact tests, the package was again transported by station wagon from Schenectady, New York to Lynn, Massachusetts for a total round trip by station wagon of approximately 450 miles.

The cover of the package was removed after the 2.25 hours of vibration testing. The stranded polystyrene foam was examined for any signs of deterioration. No apparent degradation was evident. The stranded foam did not crush or collapse and it was retained substantially in the same position as it was when originally poured into the box. After inspection of the packing at the top of the package, the cover was replaced and nailed. The package was inverted for an inspection of the post-vibration condition of the packing material at the bottom. Similar favorable results were observed upon examination of the stranded, foam packing in the bottom of the package. The regulator unit occupied substantially the same position as when it was originally packed. The resilient, interlocking, stranded, polystyrene, foam packing safe-guarded the regulator unit in such an effective manner that the unit remained in perfect operating condition despite the rigorous treatment provided by the transportation, vibration, and impact tests.

For comparative purposes the same General Electric steam seal regulator was packaged in the same box using excelsior as the packing or dunnage material. The gross weight of the packed box was 209 pounds, showing that 11 pounds of excelsior are required to provide initial protention for packing the regulator unit as contrasted to the use of only 2 pounds of the stranded, polystyrene foam. The stranded polystyrene foam was easier, faster, and cleaner to use than was the excelsior.

*Example II*

To further demonstrate the substantially superior cushioning properties of non-linear, stranded, polystyrene foam as compared with usual cushioning material, e.g. excelsior, currently employed for packing purposes, the following tests were performed. Several six cup capacity medium, utility grade porcelain teapots, as are commonly used in the home for everyday use, were chosen as test articles. This type of article was selected because the slightest breakage or damage is readily discernible upon examination. In addition, this type of earthenware is currently being shipped in a standard cushioning packing material (i.e. shredded paper, excelsior, sawdust, etc.). All tests conducted were side-by-side comparisons of the cushioning protection afforded by identical volumes of non-linear, stranded, polystyrene foam of the invention versus excelsior packing materials. Twenty identical corrugated paper shipping cartons having outside dimensions of 12 in. by 9¾ in. by 8½ in. were selected to confine the packing materials around the articles to be protected. In the bottom of cartons "A" was arranged a 2 inch cushioning layer of polystyrene foam strands having the dimensions of ⅛ inch diameter by 3 inches long and in the form of curled, bent, curved, intertangling segments having a bulk density of 0.5 pound per cubic foot of the segments. In the bottom of cartons "B" was placed a 2 inch cushioning layer of excelsior. Next, in each of the twenty cartons designated "A" and "B" there were positioned two medium, utility-grade, porcelain teapots as described previously. Two of the teapots were packaged in each carton to simulate internal contact as well as impact from the outside. The non-linear polystyrene foam strands were poured around and over the teapots in such a manner as to provide at least a 1 inch bumpering mass of the instant strands between the porcelain articles as well as on all sides of said articles. The packing of "A" cartons was completed by adding approximately a 2 inch layer of the strands over and on top of the teapots. The entire protective dunnage layer being sufficient to provide a snug, compact fit between the packaged articles and the dunnage material and prevent substantial movement of the articles when the top flaps of cartons "A" were folded and taped shut in the conventional way used to close the corrugated paper shipping cartons.

Employing similar packing procedure as disclosed in the paragraph immediately above, excelsior was packed around two of the same type of teapots in each of the "B" cartons and each carton was likewise taped shut.

The package weight of cartons "A" and contents averaged about 4 lbs. and 2 ozs. while the package weight of cartons "B" and contents averaged about 7 lbs. and 14 ozs. Subtracting the weight of the packaged teapots and the cartons, it was found that about 4 lbs. and 4 ozs. of excelsior was required to pack and fill the free spaces in each of cartons "B," while only about 7.5 ozs. of non-linear, stranded, polystyrene foam was needed to pack and fill the free spaces in each of cartons "A." Consequently, it required greater than 8 times more by weight of excelsior than of the stranded polystyrene foam to pack the articles.

Ten of the packed and sealed cartons "A" and ten of the cartons "B" as prepared above were subjected to an impact test which consisted of dropping each carton a distance of 2 feet followed by an examination of the packaged articles (teapots) for breakage. The test results shown in tabular form were as follows:

| Test number (2 foot falls) | Number of breaks | |
|---|---|---|
| | "A" cartons | "B" cartons |
| 1 | 0 | 2 |
| 2 | 1 | 1 |
| 3 | 0 | 1 |
| 4 | 0 | 1 |
| 5 | 1 | 1 |
| 6 | 0 | 2 |
| 7 | 0 | 0 |
| 8 | 1 | 1 |
| 9 | 0 | 1 |
| 10 | 1 | 1 |
| Totals | 4 | 11 |

The above results demonstrate that at least 55 percent of the utility-grade, porcelain teapots packed in excelsior were broken due to the stress of internal and external impact pressures after falling a distance of two feet, while identical, porcelain teapots packed in the mass of non-linear, individually formed strands of polystyrene foam were effectively protected in 80 percent of the tests.

What is claimed is:

1. A packaging material capable of protecting from damage an article or object sensitive to shock, vibration, and impact, said material being employed as a tangled, interlocking mass which comprises individual curled, bent, curved and twisted non-linear, elongated pieces of a foamed alkenyl aromatic polymer at least 70 percent by weight of at least one alkenyl aromatic compound having the general formula:

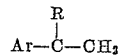

wherein "Ar" represents an aromatic hydrocarbon of the group consisting of aromatic and nuclear halogenated aromatic hydrocarbons of the benzene series, and "R" is a member of the group consisting of hydrogen and the methyl radical, said foam pieces having a substantially continuous outer plastic, skin integral with and covering the interior cellular portions thereof; said interior portions being composed for the most part of individually-closed, thin-walled cells and said elongated foam pieces having a cross sectional area equivalent to the area of a circle having a diameter of between about 0.125 and 0.75 inch with a ratio of length to cross sectional area of at least 8:1, an absolute density of between about 0.5 and 5.0 pounds per cubic foot and a bulk density of from about 0.25 to 2 pounds per cubic foot of the tangled mass.

2. A packaging material of claim 1, wherein said non-linear, elongated, individual pieces of foamed alkenyl aromatic polymer are non-linear, elongated, individual pieces of foamed polystyrene.

3. A dunnage material consisting essentially of a tangled interlocking mass of non-linear elongated, individual pieces of foamed alkenyl aromatic polymer; said pieces consisting of individual curled, bent, curved and twisted, elongated segments having a substantially continuous outer plastic skin formed integrally with and covering the interior cellular positions thereof; said interior portions being composed for the most part of individually closed, thin-walled cells and each piece of the foam having a cross sectional area equivalent to the area of a circle having a diameter of between about 0.125 and 0.75 inch with a ratio of length to cross sectional area of at least 8:1 and a bulk density of from about 0.25 to 2.0 pounds per cubic foot of the tangled mass.

4. The dunnage material of claim 3, wherein said foamed alkenyl aromatic polymer is foamed polystyrene.

References Cited in the file of this patent

UNITED STATES PATENTS

| | | |
|---|---|---|
| 1,683,843 | Nelson | Sept. 11, 1928 |
| 2,528,200 | Weinberg | Oct. 31, 1950 |
| 2,579,036 | Edelman | Dec. 18, 1951 |
| 2,649,958 | Rausch | Aug. 25, 1953 |
| 2,895,603 | Freeman | July 21, 1959 |
| 3,026,272 | Rubens et al. | Mar. 20, 1962 |

FOREIGN PATENTS

| | | |
|---|---|---|
| 1,221,360 | France | Mar. 19, 1959 |

OTHER REFERENCES

United States Rubber Co. publication "Flotofoam," bearing U.S. Patent Office date stamp of July 13, 1949. Copy available in Div. 15. Pages 4 and 6 relied on.

Lever: "Expanded and Foamed Materials," Plastic, August 1953. Copy available in Div. 15. Page 276 relied on.

UNITED STATES PATENT OFFICE
CERTIFICATE OF CORRECTION

Patent No. 3,066,382                                                December 4, 1962

Maurice L. Zweigle et al.

It is hereby certified that error appears in the above numbered patent requiring correction and that the said Letters Patent should read as corrected below.

Column 3, line 42, after "foamed" insert -- polymer --; line 75, after "foaming" strike out -- and --.

Signed and sealed this 16th day of July 1963.

(SEAL)
Attest:

ERNEST W. SWIDER                                  DAVID L. LADD
Attesting Officer                                     Commissioner of Patents